United States Patent [19]
Chuang

[11] Patent Number: 6,011,656
[45] Date of Patent: Jan. 4, 2000

[54] WIDE-ANGLE PROJECTION ZOOM LENS

[75] Inventor: Fu-Ming Chuang, Hsinchu Hsien, Taiwan

[73] Assignee: Industrial Technology Research Institute, Hsinchu, Taiwan

[21] Appl. No.: 09/173,488

[22] Filed: Oct. 14, 1998

[30] Foreign Application Priority Data

Jul. 17, 1998 [TW] Taiwan ................................. 87111664

[51] Int. Cl.$^7$ .................................................. G02B 15/14
[52] U.S. Cl. ......................... 359/684; 359/686; 359/680; 359/676
[58] Field of Search .................................... 359/663, 676, 359/680, 682–684, 686, 649–650, 753–754, 771, 781

[56] References Cited

U.S. PATENT DOCUMENTS 5,627,681  5/1997  Tsay ........................................ 359/686
5,914,820  6/1999  Takimoto et al. ....................... 359/686
5,936,780  8/1999  Chuang et al. .......................... 351/691

Primary Examiner—Georgia Epps
Assistant Examiner—David N. Spector
Attorney, Agent, or Firm—Jiawei Huang; J.C. Patents

[57] ABSTRACT

A wide-angle zoom lens includes four sets of lenses. The first set of lenses has a negative effective focal length. The second set of lenses has a positive effective focal length for changing the focal length of the wide-angle zoom lens. The third set of lenses has a negative effective focal length for changing the focal length of the wide-angle zoom lens, as well. The fourth set of lenses has a positive effective focal length. The focal length of the wide-angle zoom lens can be changed by changing the positions of the second set of lenses and the third set of lenses along the optical axis of the wide-angle zoom lens.

7 Claims, 11 Drawing Sheets

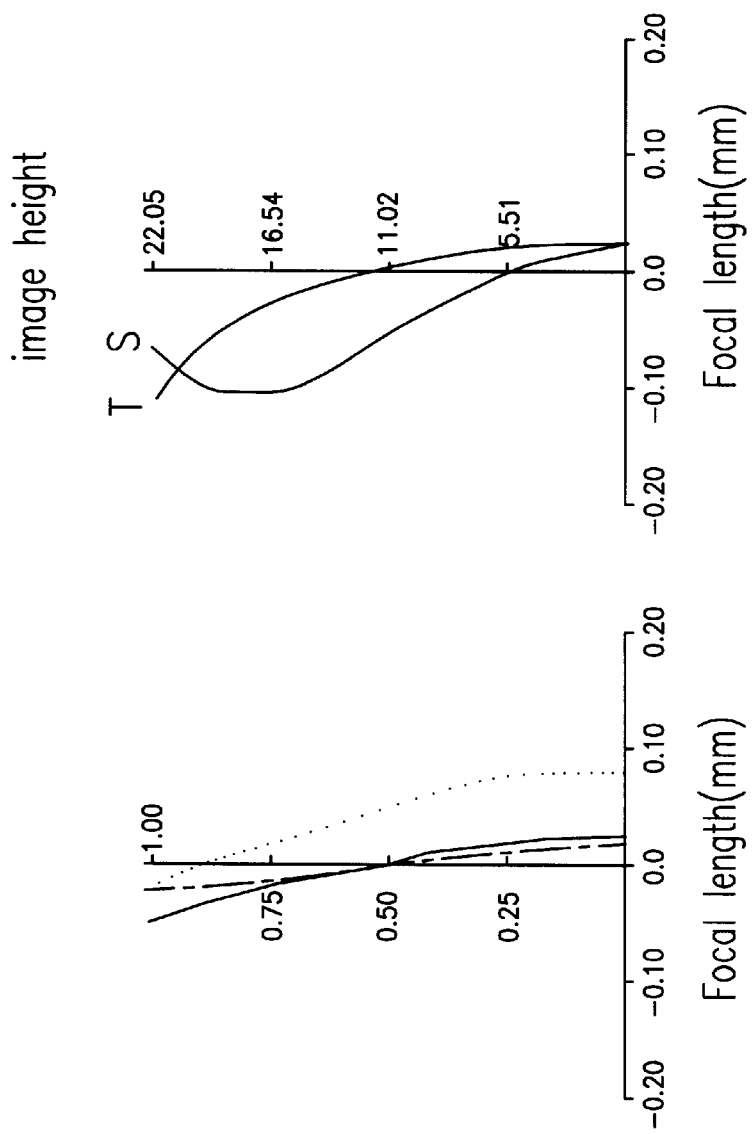

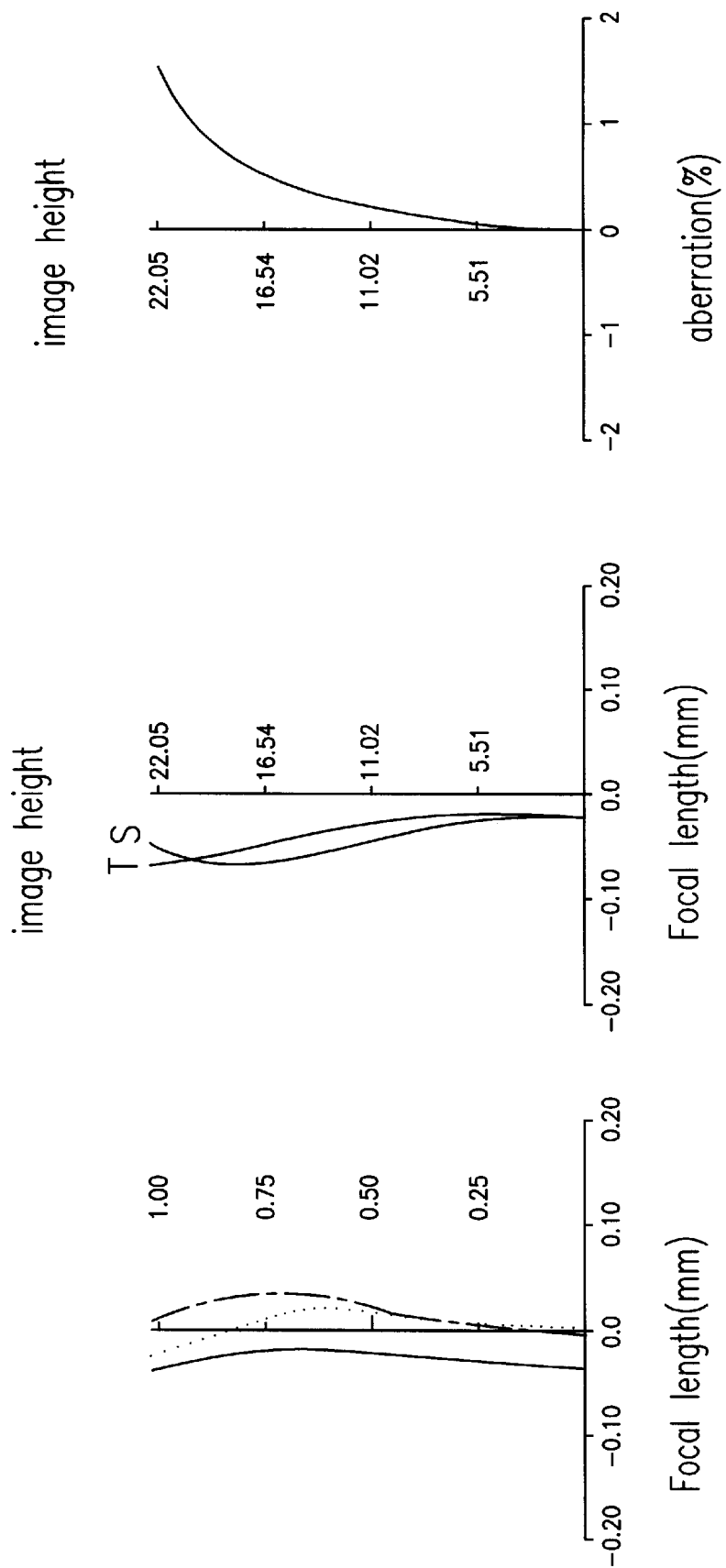

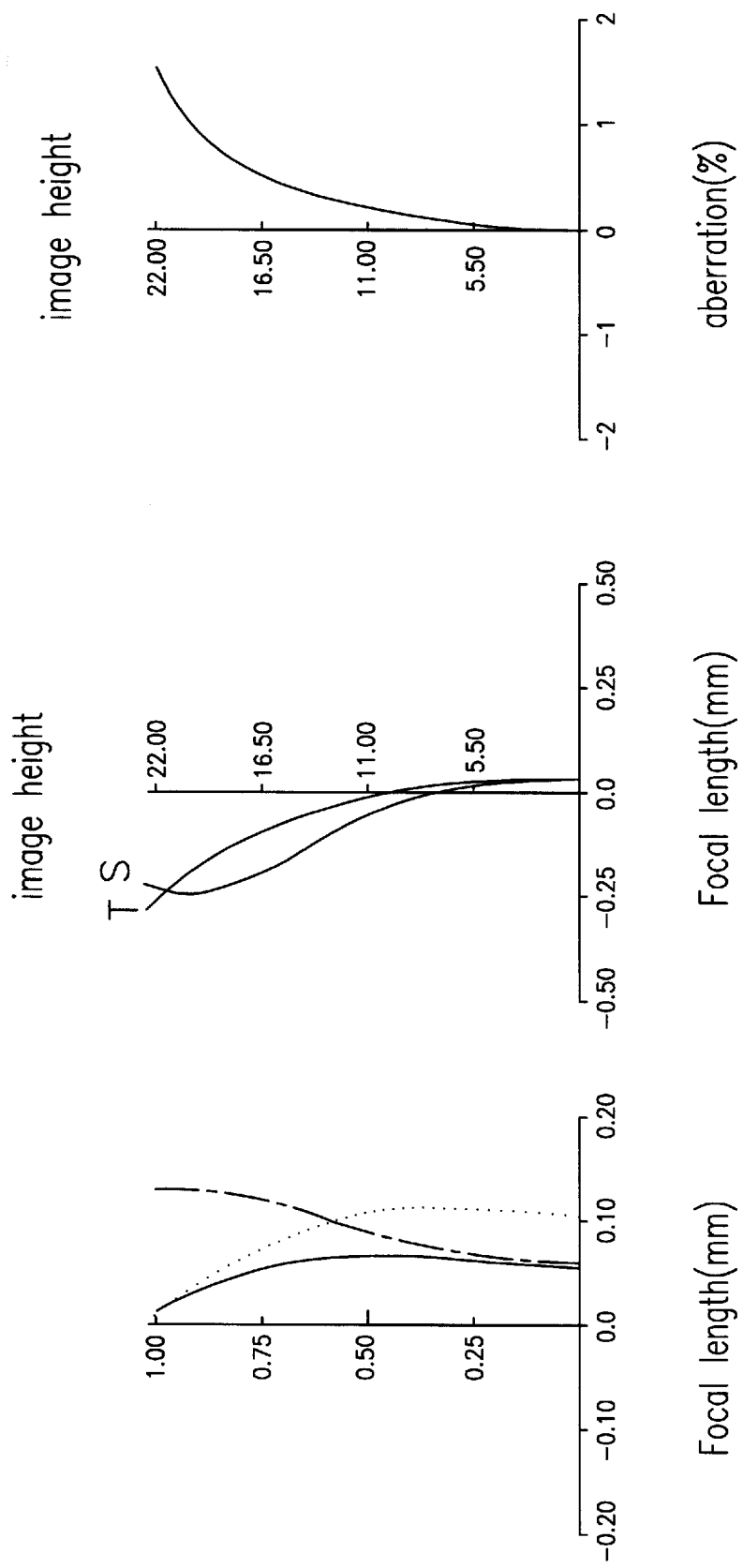

WIDE-ANGLE PROJECTION ZOOM LENS

CROSS-REFERENCES TO RELATED APPLICATION

This application claims the priority benefit of Taiwan application serial no. 87111664, filed Jul. 17, 1998, the full disclosure of which is incorporated herein by reference.

BACKGROUND OF THE INVENTION

1. Field of the Invention

This invention relates to a zoom lens, and more particularly, to a wide-angle zoom lens of a projector for projecting images.

2. Description of Related Art

Demands for a projector for displaying images on a large-dimension screen have increased in both the family domain and business domain. Since the displaying angles of the projectors currently available in the market are not wide enough, that is, the focal lengths of those projectors are too long, a longer distance between a zoom lens and the screen is needed for displaying an image on a large-dimension screen. Therefore, in a case that a liquid crystal display (LCD) panel, which has a fixed dimension, is used as an object, displaying images on a large-dimension screen cannot be accomplished by using those zoom lenses available today.

As referring to Table 1, the listed zoom lenses from different manufacturers, such as NEC, Toshiba, Philip, Sanyo, and Panasonic, are not able to display images on a large-dimension screen within a limited space, wherein the displayed object is a 1.3-inch LCD panel. In Table 1, column 3, column 4, column 5, and column 6 represent the f-number of the projection system (FNO), focal length for wide-mode position (EFL1, in millimeter), focal length for tele-mode (EFL2, in millimeter), and projection distance (L, in meter) of each zoom lens, respectively. The adjustable focal point of the 1.3-inch LCD panel varies from about 47.5 mm to 52.5 mm. In the case of displaying an image on a large-dimension screen, a 200-inch screen for example, the shortest distance needed for the zoom lens of model number PLC-8800 from Sanyo is 7.37 m at the widest projecting angle of 47.6 mm. For most middle size conference rooms, the foregoing required conditions for displaying an image on a large-dimension screen normally cannot be fulfilled.

TABLE 1

| Manufacturer | Model Number | FNO | EFL1 | EFL2 | L |
|---|---|---|---|---|---|
| NEC | MULTISYNC MT1000 | 2.5~ | 52 | 73 | 8.05 |
| Toshiba | TLP-511 | 2.5~3.0 | 50 | 70 | 7.74 |
| Philip | PROSCREEN 4600 | 2.9~3.5 | 50 | 75 | 7.74 |
| Sanyo | PLC-8800 | 2.5~3.5 | 47.6 | 76.2 | 7.37 |
| Panasonic | PT-L390E | 3.2~3.5 | 53.5 | 76.4 | 8.28 |

According to the foregoing, a conventional zoom lens, which requires a long distance between the zoom lens and the display screen, is not suitable for most regular-size conference rooms.

SUMMARY OF THE INVENTION

It is therefore an objective of the present invention to provide a zoom lens for displaying an image on a large-dimension screen within a distance shorter than what a conventional zoom lens needs.

In accordance with the foregoing and other objectives of the present invention, the invention provides a wide-angle zoom lens that has a short focal length and a wide projecting angle. The wide-angle zoom lens according to the invention consists of four sets of lenses, wherein the wide-angle zoom lens is placed between the screen and the object, a LCD panel. The first set of lenses is used for focusing, wherein the entire set of lenses remains fixed while focussing proceeds, and wherein the effective focal length of the first set of lenses is negative. The second set of lenses is used to change the focal length of the wide-angle zoom lens, wherein the effective focal length of the second set of lenses is positive. The third set of lenses is also used to change the focal length of the wide-angle, wherein the effective focal length of the third set of lenses is negative. All lenses of the fourth set of lenses remain fixed during focusing, wherein the effective focal length of the fourth set of lenses is positive. The effective focal length of the wide-angle zoom lens can be changed by tuning the positions of the second set of lenses and the third set of lenses along the optical axis of the wide-angle zoom lens.

In conclusion, the wide-angle zoom lens according to the invention allows an image to be displayed on a large-dimension screen within a limited space.

BRIEF DESCRIPTION OF DRAWINGS

The invention can be more fully understood by reading the following detailed description of the preferred embodiments, with reference made to the accompanying drawings, wherein:

FIGS. 4A through 4C are plots showing the spherical aberrations, astigmatic differences, and aberrations of the first preferred embodiment at the shortest focal point and at an object distance of 2 m, respectively;

FIGS. 5A through 5C are plots showing the spherical aberrations, astigmatic differences, and aberrations of the first preferred embodiment at the longest focal point and at an object distance of 2 m, respectively;

FIGS. 8A through 8C are plots showing the spherical aberrations, astigmatic differences, and aberrations of the second preferred embodiment at the longest focal point and at an object distance of 4 m, respectively;

DETAILED DESCRIPTION OF PREFERRED EMBODIMENTS

The First Preferred Embodiment

Figure 1:
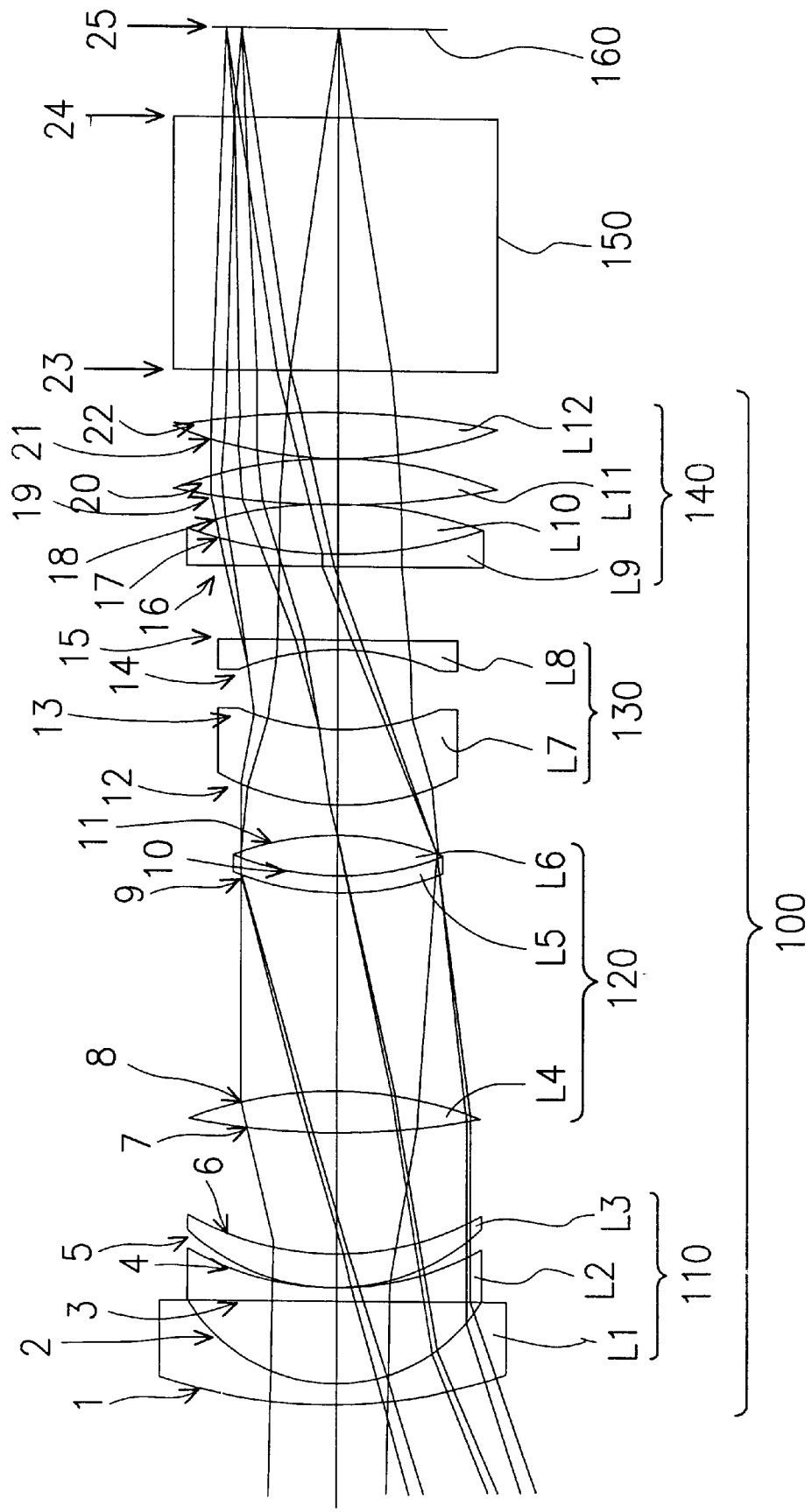
FIG. 1 is a structural cross-sectional view showing the wide-angle zoom lens described in the first preferred embodiment of the invention.

The invention provides a new wide-angle zoom lens of a projector for displaying images on a larger screen within a limited space, wherein the wide-angle zoom lens of the invention is shown in FIG. 1.

Referring to FIG. 1. the wide-angle zoom lens of the invention 100 consists of four sets of lenses between the image end and the object end, an LCD panel. Starting from the image end, the first set of lenses 110 consists of lenses L1, L2, and L3, wherein L1 and L2 are negative lenses, and L3 is a positive lens, and wherein the effective focal length of the first set of lenses 110 is negative. The first set of lenses 110 is used as a focusing set, wherein the entire set of lenses remains still while focusing proceeds. The second set of lenses 120 consists of lenses L4, L5, and L6, wherein L4 is a positive lens, and L5 is adhered to L6 to form a doublet, and wherein the effective focal length of the second set of lenses 120 is positive. The second set of lenses 120 is used to change the focal length of the wide-angle zoom lens 100. The third set of lenses 130 consists of lenses L7 and L8. L7 and L8 are both negative lenses, and the effective focal length of the third set of lenses 130 is negative. The third set of lenses 130 is also used to change the focal length of the wide-angle zoom lens 100. The fourth set of lenses 140 consists of lenses L9, L10, L11, and L12, wherein L9 is adhered to L10 to form a doublet, and L11 and L12 are both positive lenses. The effective focal length of the fourth set of lenses 140 is positive. All lenses of the fourth set of lenses 140 remain still while focusing proceeds. The effective focal length of the entire wide-angle zoom lens 100 can be adjusted by tuning the positions of the second set of lenses 120 and the third set of lenses 130 along the optical axis of the wide-angle zoom lens 100. The effective focal lengths of the wide-angle zoom lens 100 furthermore satisfy the following conditions:

$$0.8f_T < |f_1| < 1.2f_T, \quad (1)$$

$$0.8f_T < f_2 < 1.2f_T, \quad (2)$$

$$0.8f_T < |f_3| < 1.2f_T, \quad (3)$$

$$0.9f_W < f_4 < 1.2f_W, \quad (4)$$

$$|F_7| > 400, \quad (5)$$

$$N_8 < 1.59 \quad (6)$$

$f_1$ through $f_4$ are the effective focal lengths of the first set of lenses 110, the second set of lenses 120, the third set of lenses 130, and the fourth set of lenses 140. respectively. $f_T$ and $f_W$ represent the focal length of the wide-angle zoom lens of the invention in a tele-mode position and a wide-mode position, respectively. $F_7$ is the focal length of lens L7, and $N_8$ is the refractive index of lens L8.

The foregoing equations (1) through (3) are the limitations for controlling the focal lengths of the first set of lenses 110, the second set of lenses 120, and the third set of lenses 130. If the focal length is too short, it becomes difficult to eliminate the aberration, because either the number of lenses or the curvatures of lenses must be increased to eliminate the aberration. If the focal length is too long, the total length of the projecting system is over-sized.

Equation (4) is used to limit the effective focal length of the fourth set of lenses 140 within a reasonable range. Because the wide-angle zoom lens of the invention is a telecentric system, the principal ray passes through lenses at a higher position. If the effective focal length of the system is too short, it is difficult to improve the problem of aberration. On the other hand, a long effective length of the system is contrary to the objective of the invention.

Equation (5) shows that the focal length of lens L7 is very long (longer than 400). Since the curvature of the lens L7 is very small, it is less important for the total curvature of the third set of lenses, and it does little to the total aberration as well. The purpose of adding lens L7 is to lower the position the principal ray when it passes through the fourth set of lenses 140. The off-axis aberrations, such as coma, astigmatic, and distortion are respectively proportional to the height of the position where the principal ray passes through a lens, the square of the height of the position where the principal ray passes through a lens, and the cube of the height of the position where the principal ray passes through a lens. Therefore, adding lens L7 easily corrects the off-axis aberration of the fourth set of lenses 140.

Equation (6) is to limit the occurrence of curvature of field. As $N_8$ is less than 1.59, the curvature of field of the fourth set of lenses 140 is less than the standard curvature of field, and that leads to a situation that the curvature of field of the entire zoom lens 100 is under-corrected.

Referring to Table 2, the geometric data of all the lenses, lens L1 through lens L12, used in a preferred embodiment of the invention are listed. The indexes 1 through 22 represent the spherical surface of lenses 1 through 22 shown in FIG. 1. R is the radius of the spherical surface of each lens. D represents the thickness of a lens or the distance between two neighboring lenses. N represents the refractive index of lenses for d lines of sodium. V represents the Abbe numbers.

In this preferred embodiment of the invention, the focal lengths of the wide-angle zoom lens of the invention at tele-mode position and wide-mode position are 58.05 mm for $f_T$ and 43 mm for $f_W$, respectively. The focal lengths of each set of lenses are −62.56 mm for $f_1$, 62.18 mm for $f_2$, −60.8 mm for $f_3$, and 44.7 mm for $f_4$. The focal length of lens $L_7$, $F_7$, is −539.6 mm, and the refractive index of lens $L_8$, $N_8$, is 1.5305.

Figures 2A, 2B, 2C:
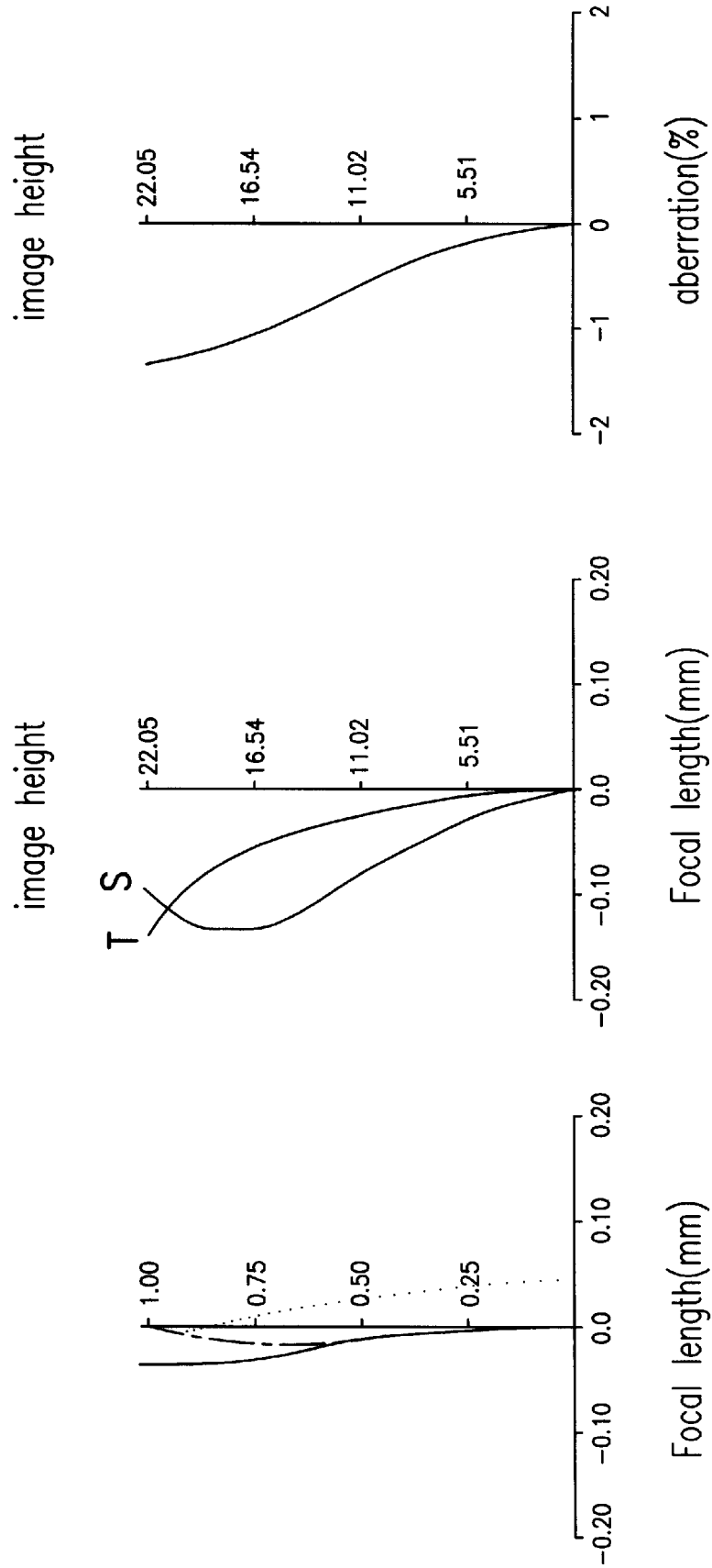
FIGS. 2A through 2C are plots showing the spherical aberrations, astigmatic differences, and aberrations of the first preferred embodiment at the shortest focal point and at an object distance of 4 m, respectively.
Figures 3A, 3B, 3C:
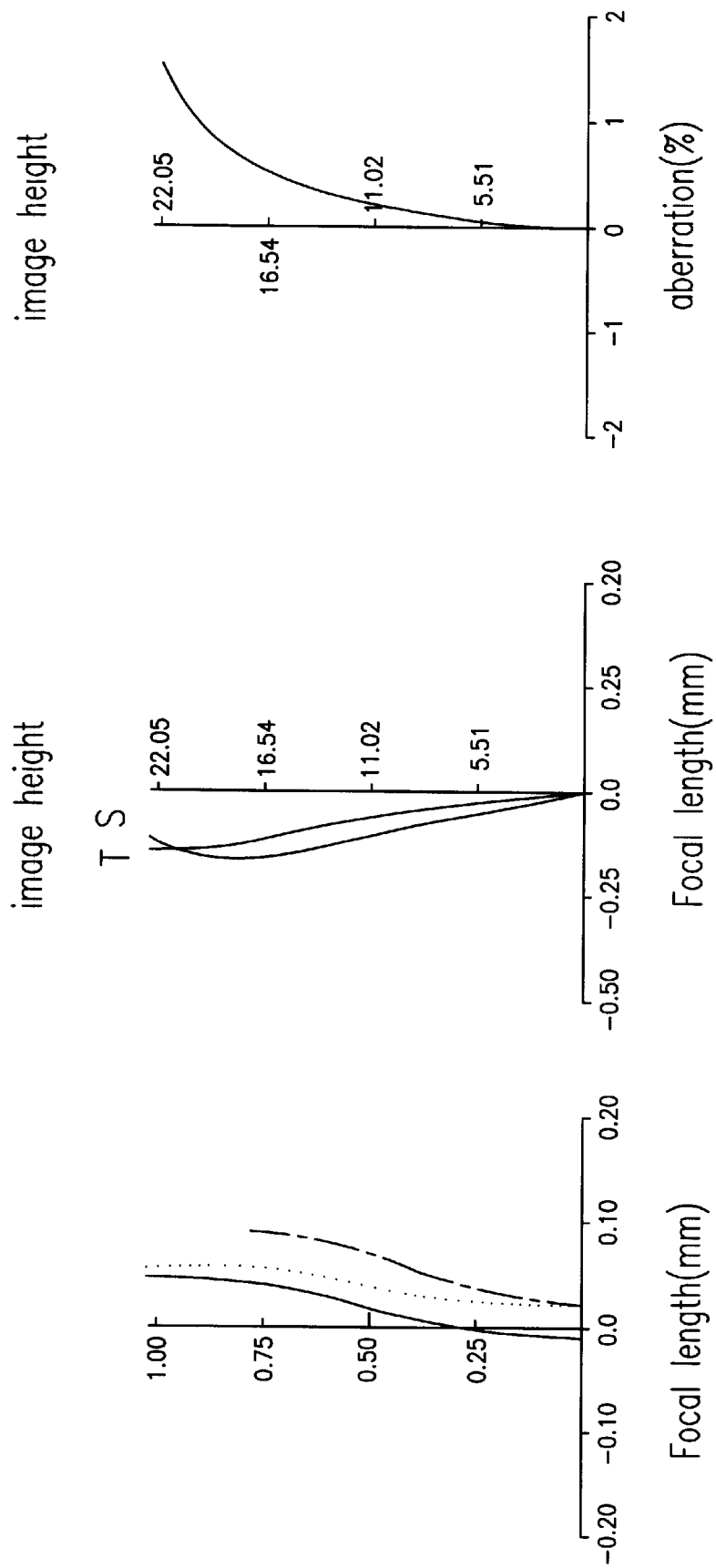
FIGS. 3A through 3C are plots showing the spherical aberrations, astigmatic differences, and aberrations of the first preferred embodiment at the longest focal point and at an object distance of 4 m, respectively.

FIGS. 2A through 2C are plots respectively showing the spherical aberration. astigmatic difference, and aberration of images formed by the zoom lens 100 at the wide-mode position with a focal length $f_W$ equal to 43 mm wherein the subject distance is 4 m. FIGS. 3A through 3C are plots respectively showing the spherical aberration, astigmatic difference, and aberration of images formed by the zoom lens 100 at the tele-mode position with a focal length $f_T$ equal to 58.05 mm, wherein the subject distance is 4 m.

FIGS. 4A through 4C are plots respectively showing the spherical aberration, astigmatic difference, and aberration of images formed by the zoom lens 100 at the wide-mode position with a focal length $f_W$ equal to 43 mm, wherein the subject distance is 2 m. FIGS. 5A through 5C are plots respectively showing the spherical aberration, astigmatic difference, and aberration of images formed by the zoom lens 100 at the tele-mode position with a focal length $f_T$ equal to 58.5 mm, wherein the subject distance is 2 m.

TABLE 2

$F_{NO} = 2.5 \sim 3.0$  $f = 43.00 \sim 58.05$  $\omega = 54.3° \sim 41.5°$

| Lens | R | D | N | V |
|---|---|---|---|---|
| 1 | 103.50 | 2.150 | 1.700293 | 58.72 |
| 2 | 37.84 | 9.690 | | |
| 3 | ∞ | 1.950 | 1.519036 | 68.22 |
| 4 | 73.42 | 0.300 | | |
| 5 | 50.13 | 3.400 | 1.769709 | 27.55 |
| 6 | 63.14 | 23.668~8.08 | | |
| 7 | 360.95 | 4.550 | 1.700293 | 58.72 |
| 8 | −123.43 | 35.880 | | |
| 9 | 30.60 | 1.500 | 1.856470 | 24.59 |
| 10 | 44.48 | 5.520 | 1.489414 | 74.95 |
| 11 | −78.69 | 4.000~25.32 | | |
| 12 | 32.82 | 10.920 | 1.856470 | 24.59 |
| 13 | 25.94 | 12.610 | | |
| 14 | −35.50 | 1.400 | 1.534743 | 51.39 |
| 15 | 317.16 | 11.371~5.64 | | |
| 16 | −158.15 | 1.560 | 1.1813893 | 26.34 |
| 17 | 88.93 | 10.550 | 1.489414 | 74.95 |
| 18 | −49.29 | 0.300 | | |
| 19 | 204.57 | 7.510 | 1.700293 | 58.72 |
| 20 | −96.21 | 0.300 | | |
| 21 | 84.12 | 7.520 | 1.700293 | 58.72 |
| 22 | −643.38 | 8.000 | | |
| 23 | ∞ | 40.000 | 1.519039 | 68.15 |
| 24 | ∞ | 10.000 | | |
| 25 | ∞ | 0.000 | | |

The Second Preferred Embodiment

Figure 6:
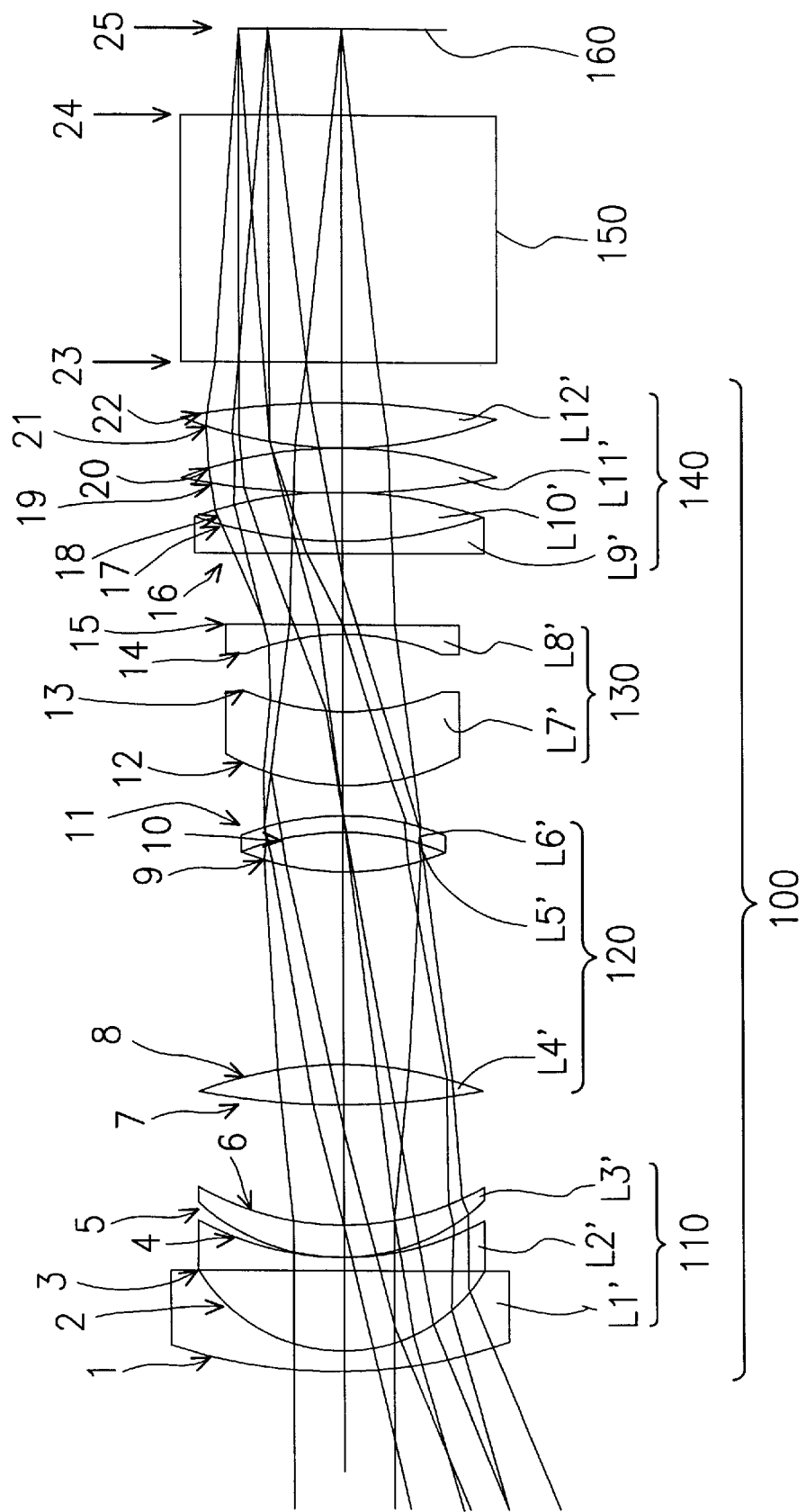
FIG. 6 is a structural cross-sectional view showing the wide-angle zoom lens described in the second preferred embodiment of the invention.

The structural diagram of zoom lens 100 in the second preferred embodiment according to the invention is shown in FIG. 6.

Referring to FIG. 6, the properties of sets of lenses 110 to 140 in a zoom lens 100 according to the invention are also controlled by the equations (1) through (6).

Referring to Table 3, the geometric data of all the lenses, lens L1' through lens L12', used in the second preferred embodiment of the invention are listed. The indexes 1 through 22 represent the spherical surfaces of lenses 1 through 22 shown in FIG. 6. R is the radius of the spherical surface of each lens. D represents the thickness of a lens or the distance between two neighboring lenses. N represents the refractive index of lenses for d lines of sodium. V represents the Abbe numbers.

In this preferred embodiment of the invention, the focal lengths of the wide-angle zoom lens of the invention in tele-mode position and wide-mode position is 58.05 mm for $f_T$ and 43 mm for $f_W$, respectively. The focal lengths of each set of lenses are −52.45 mm for $f_1$, 56.4 mm for $f_2$, −64.84 mm for $f_3$, and 48.12 mm for $f_4$. The focal length of lens $L_7$, $F_7$, is −457.482 mm, and the refractive index of lens $L_8$, $N_8$ is 1.58.

Figure 7C:
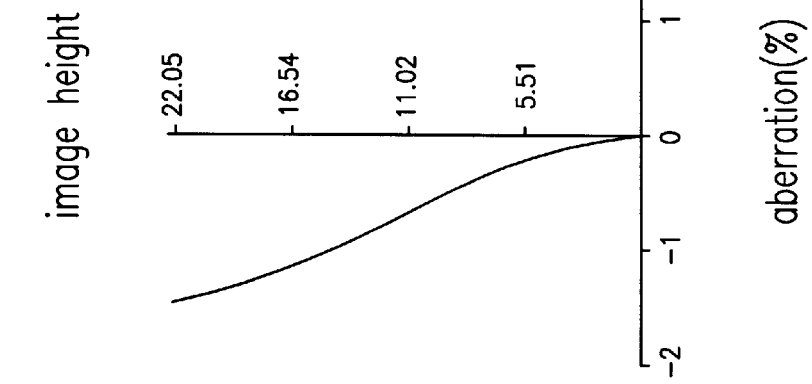
FIGS. 7A through 7C are plots showing the spherical aberrations, astigmatic differences, and aberrations of the second preferred embodiment at the shortest focal point and at an object distance of 4 m, respectively.
Figure 7B:
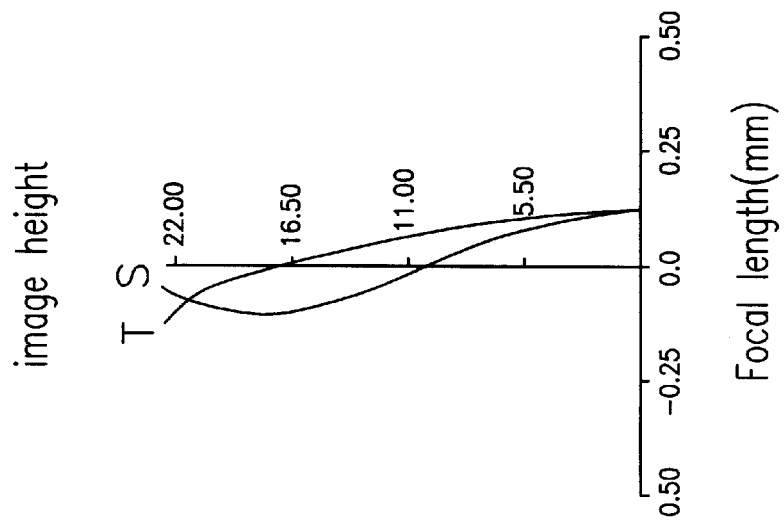
Figure 7A:
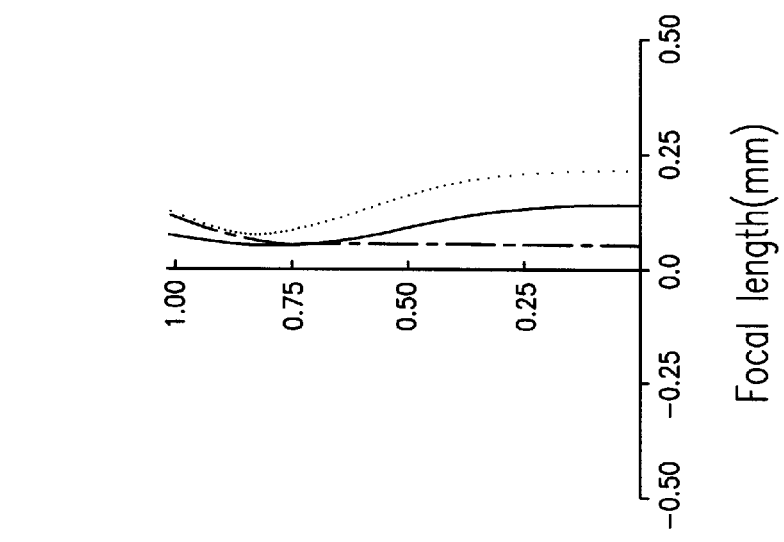
Figure 10C:
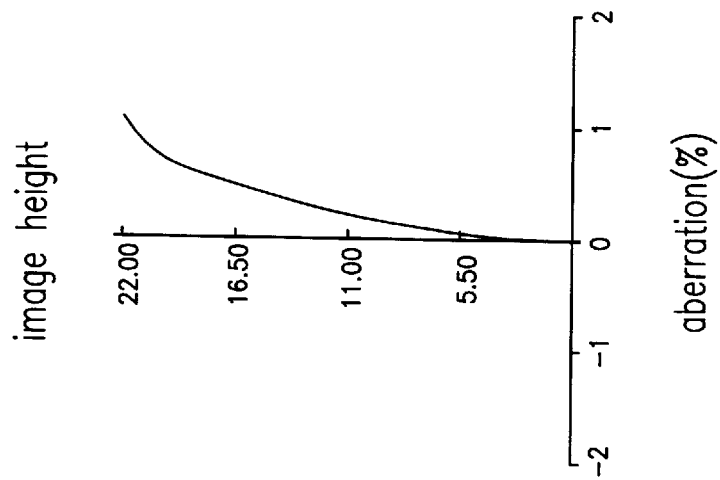
FIGS. 10A through 10C are plots showing the spherical aberrations, astigmatic differences, and aberrations of the second preferred embodiment at the longest focal point and at an object distance of 2 m, respectively.
Figure 10B:
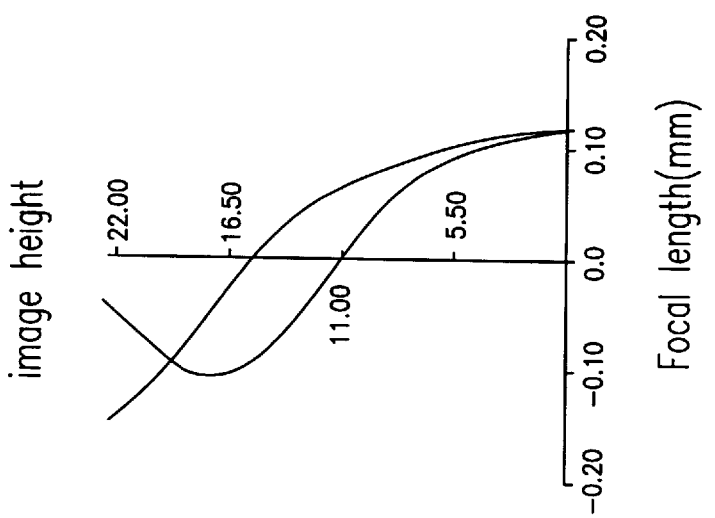
Figure 10A:
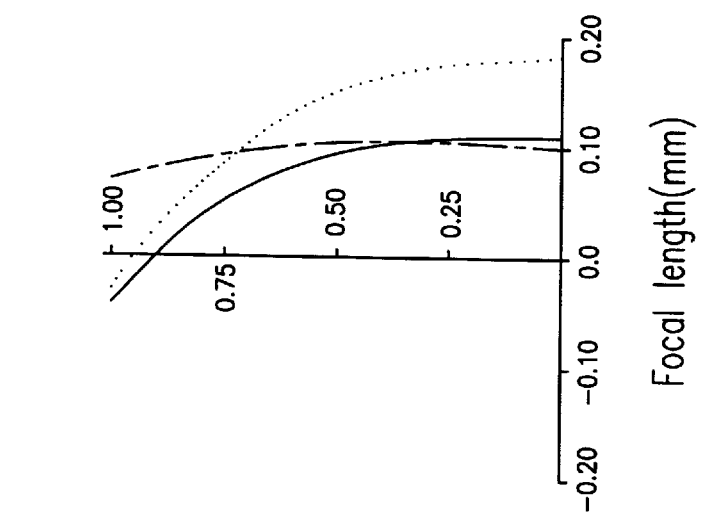

FIGS. 7A through 7C are plots respectively showing the spherical aberration, astigmatic difference, and aberration of images formed by the zoom lens 100 in the wide-mode position with a focal length $f_W$ equal to 43 mm, wherein the subject distance is 2 m. FIGS. 10A through 10C are plots respectively showing the spherical aberration, astigmatic difference, and aberration of images formed by the zoom lens 100 at the tele-mode position with a focal length $f_T$ equal to 58.05 mm, wherein the subject distance is 4 m.

Figures 9A, 9B, 9C:
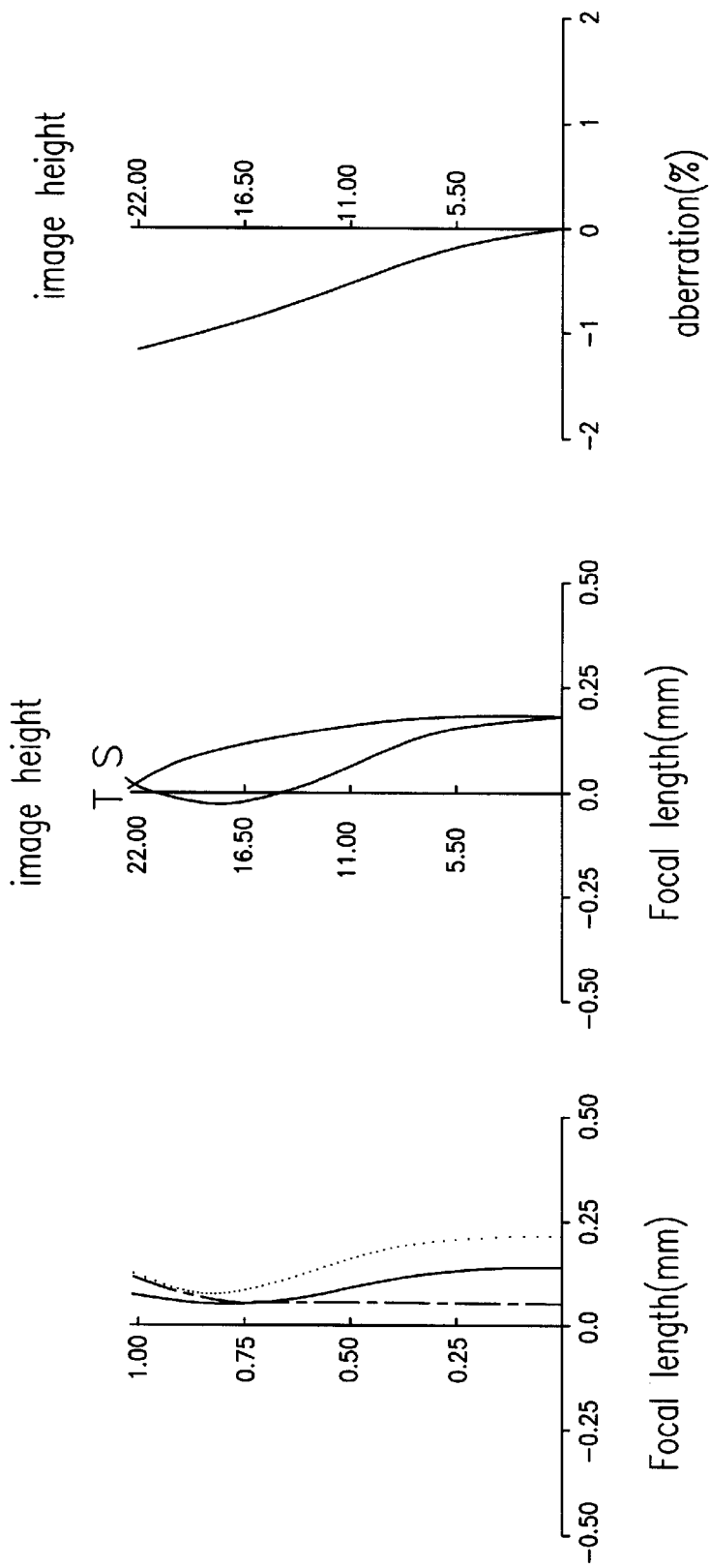
FIGS. 9A through 9C are plots showing the spherical aberrations, astigmatic differences, and aberrations of the second preferred embodiment at the shortest focal point and at an object distance of 2 m, respectively.

FIGS. 9A through 9C are plots respectively showing the spherical aberration, astigmatic difference, and aberration of images formed by the zoom lens 100 in the wide-node position with a focal length $f_W$ equal to 43 mm, wherein the subject distance is 2 m. FIGS. 10A through 10C are plots respectively showing the spherical aberration, astigmatic differences, and aberration of images formed by the zoom lens 100 in the tele-mode position with a focal length $f_T$ equal to 58.5 mm wherein the subject distance is 2 m.

TABLE 3

$F_{NO} = 2.5 \sim 3.0$  $f = 43.00 \sim 58.05$  $\omega = 54.3° \sim 41.5°$

| Lens | R | D | N | V |
|---|---|---|---|---|
| 1 | 75.81 | 2.000 | 1.793123 | 26.60 |
| 2 | 32.21 | 8.560 | | |
| 3 | 459.27 | 1.650 | 1.700293 | 58.72 |
| 4 | 66.01 | 0.300 | | |
| 5 | 41.21 | 3.780 | 1.856470 | 24.59 |
| 6 | 52.44 | 26.401~8.59 | | |
| 7 | 828.00 | 4.220 | 1.792987 | 26.99 |
| 8 | −122.09 | 26.150 | | |
| 9 | 73.27 | 11.000 | 1.489414 | 74.95 |
| 10 | −31.06 | 3.000 | 1.599718 | 41.00 |
| 11 | −55.54 | 4.000~26.13 | | |
| 12 | 53.24 | 11.000 | 1.856470 | 24.59 |
| 13 | 55.74 | 12.380 | | |
| 14 | −58.56 | 1.500 | 1.585376 | 42.76 |
| 15 | 58.56 | 17.653~8.33 | | |
| 16 | −153.15 | 1.800 | 1.856470 | 24.59 |
| 17 | 68.00 | 11.230 | 1.700293 | 58.72 |
| 18 | −68.00 | 0.300 | | |
| 19 | 160.09 | 6.930 | 1.700293 | 58.72 |
| 20 | −160.09 | 0.300 | | |
| 21 | 82.44 | 7.230 | 1.700293 | 58.72 |
| 22 | ∞ | 9.500 | | |
| 23 | ∞ | 40.000 | 1.519039 | 68.15 |
| 24 | ∞ | 10.000 | | |
| 25 | ∞ | 0.000 | | |

The Third Preferred Embodiment

Figure 11:
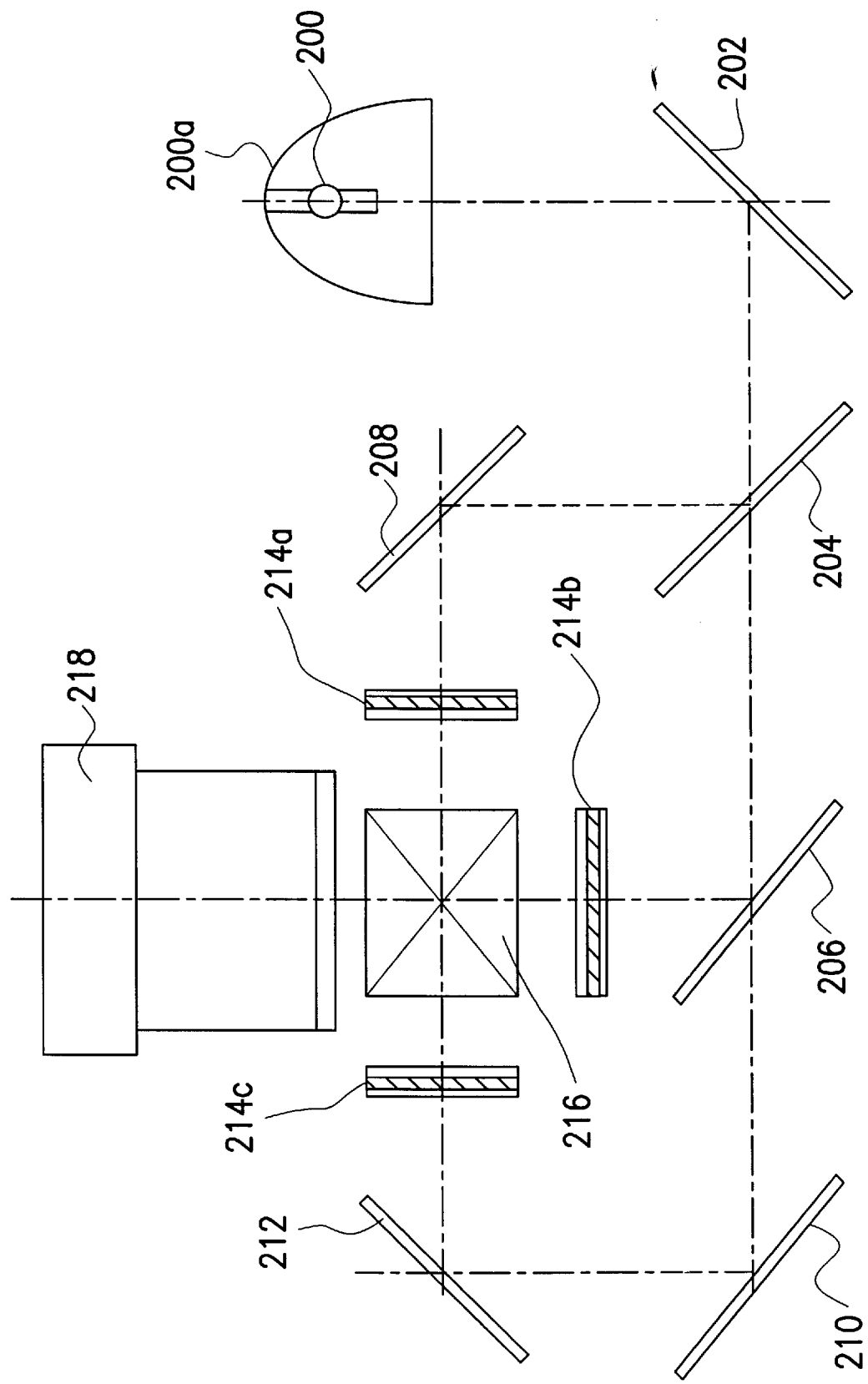
FIG. 11 is a schematic diagram showing the setup of a projecting system using the wide-angle zoom lens of the invention.

A schematic diagram showing the setup of a projecting system using the wide-angle zooms lens of the invention is shown in FIG. 11.

Referring to FIG. 11, a light source 200 of white light provides a parallel light beam by the presence of a parabolic mirror 200a. The parallel white light beam is divided into red light (R), green light (G), and blue light (B) by a set of bicolor spectroscopes 204 and 206, wherein the red light, green light, and the blue light are reflected toward the LCD panels 214a, 214b, and 214c by using planar mirrors 208, 210, and 212 respectively. Then, the red light, green light, and the blue light compose a color image through a color synthetic device 216, such as an X-prism, wherein the composed image is projected onto a screen through the zoom lens 218 of the invention.

It is a specificity of the invention to provide a wide-angle zoom lens that is able to project an image onto a larger screen within a limited distance.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A wide-angle zoom lens, from a projecting end to an object end, the zoom lens comprising:

a first set of lenses for focusing, wherein the first set of lenses remains still while focusing proceeds, and wherein the effective focal length of the first set of lenses is negative;

a second set of lenses for changing the focal length of the wide-angle zoom lens, wherein the effective focal length of the second set of lenses is positive;

a third set of lenses for changing the focal length of the wide-angle zoom lens, wherein the effective focal length of the third set of lenses is negative; and a fourth set of lenses, wherein the fourth set of lenses remains fixed while focusing proceeds, and wherein the effective focal length of the fourth set of lenses is positive, wherein the focal length of the wide-angle zoom lens is changed by changing the position of the second set of lenses and the position of the third set of lenses along an optical axis of the wide-angle zoom lens, and wherein the wide-angle zoom lens fulfills a plurality of equations, wherein the equations comprise:

$0.8f_T < |f_1| < 1.2f_T$, $0.8f_T < f_2 < 1.2f_T$, $0.8f_T < |f_3| < 1.2f_T$, $0.9f_W < |f_4| < 1.2f_W$,

Wherein $f_1$ is the effective focal length of the first set of lenses, $f_2$ is the effective focal length of the second set of lenses, $f_3$ is the effective focal length of the third set of lenses, and $f_4$ is the effective focal length of the fourth set of lenses, $f_T$ represents the focal length of the wide-angle zoom lens at the tele-mode position, $f_W$ represents the focal length of the wide-angle zoom lens at the wide-mode position.

2. The wide-angle zoom lens of claim 1, wherein the first set of lenses further comprises a first lens, a second lens, and a third lens, and wherein the first lens and the second lens are negative lenses, and the third lens is a positive lens.

3. The wide-angle zoom lens of claim 1, wherein the second set of lenses further comprises a fourth lens, a fifth lens, and a sixth lens, and wherein the fourth lens is a positive lens, and the fifth lens is adhered to the sixth lens to form a first doublet.

4. The wide-angle zoom lens of claim 1, wherein the third set of lenses further comprises a seventh lens and an eighth lens, and wherein the seventh lens and the eighth lens are both negative lenses.

5. The wide-angle zoom lens of claim 4, wherein the absolute value of the focal length of the seventh lens is greater than 1.59.

6. The wide-angle zoom lens of claim 4, wherein the refractive index of the eighth lens is less than 1.59.

7. The wide-angle zoom lens of claim 1, wherein the fourth set of lenses further comprises a ninth lens, a tenth lens, an eleventh lens, and a twelfth lens, and wherein the ninth lens is adhered to the tenth lens to form a second doublet, and eleventh lens and the twelfth lens are both positive lenses.

* * * * *